Nov. 3, 1964     J. H. LEE     3,155,385

END CLAMP

Filed June 30, 1961

INVENTOR.
JAMES H. LEE

BY *R. E. Geougue*

ATTORNEY

United States Patent Office 3,155,385
Patented Nov. 3, 1964

3,155,385
END CLAMP
James H. Lee, Lawndale, Calif., assignor to Wedgelock Corporation of California, North Hollywood, Calif., a corporation of California
Filed June 30, 1961, Ser. No. 121,143
1 Claim. (Cl. 269—236)

This invention relates to clamps and more particularly to an end clamp which is useful for clamping a pair of components together in end-to-end relationship.

More specifically, this invention provides a new and improved end clamp which includes a pair of spaced parallel free ends insertable as into the openings of a pair of cellular components such as honeycomb sections, for temporarily securing the components in end-to-end relationship while being permanently or semi-permanently secured. It will be recognized, however, that other uses may be applied to the end clamp of this invention, as for clamping other components in end-to-end relationship.

In many applications where relatively-thick cellular cores are sandwiched between outer, relatively-thin sheets or skins, the cellular core, of honeycomb, or other configuration, is pre-cut and interfitted in end-to-end relationship prior to securement thereof to the outer skins. In the past, the sections of cellular material have been abutted in end-to-end relationship on one of the skins and secured together by pouring a mastic, cement, or the like, in transverse openings formed at the junction of the sections; after which the outer skins are secured to the cellular sections by electro-welding, or the like.

By such means, if the pre-cut cellular material did not fit tightly in end-to-end relationship, gaps were formed in the openings formed at the edges. As a result, plastic material poured into the openings would not be confined to the openings alone and an excess of material would spread over the bottom skin supporting the cellular material. Furthermore, if the edges of the cellular material are not in good electrical contact, the process of securing the skins thereto is hampered.

Since the saving of weight is a primary function of the use of the cellular material, the excess of sealing compound used is objectionable, and impractical. By the use of the instant invention, the honeycomb sections may be tightly temporarily clamped together while filling of the tubular openings formed therebetween so as to require a minimal amount of plastic sealing compound to fill the openings and good electrical contact between ends of the cellular material is ensured.

It is therefore an object of this invention to provide a new and improved end clamp for temporarily securing a pair of components having a cellular construction together in tight end-to-end relationship.

Another object of this invention is to provide a new and improved end clamp which is easily and quickly applicable to the components and is readily removable therefrom.

A further object of this invention is to provide a new and improved end clamp which is easily and readily operable for clamping together free ends thereof so as to temporarily secure the components in end-to-end relationship, and which is readily and quickly releasable therefrom for removal thereof.

Yet another object of this invention is to provide a new and improved end clamp which provides new and improved cam means for operation thereof, wherein the cam means provides positive means for holding the free ends of the clamp in clamping or non-clamping relationship.

Yet another object of this invention is to provide an end clamp of the character described which is economical to manufacture and is capable of mass production.

A general object of this invention is to provide a new and improved end clamp of the character described which overcomes disadvantages of prior means and methods heretofore intended to accomplish generally the same purposes.

These and other objects of this invention will be more apparent from the following detailed description, drawings and appended claim.

Figure 1:
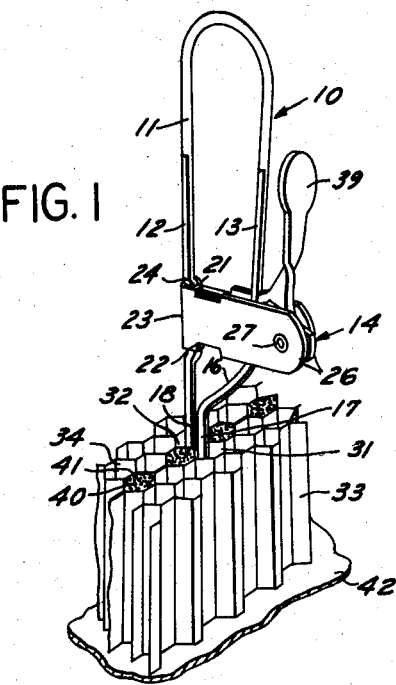
FIGURE 1 is a perspective view, in elevation, of the end clamp of this invention as applied to a pair of cellular components for clamping thereof in end-to-end relationship.

Referring in detail to the drawings, there is shown, by way of illustration, but not of limitation, an end clamp designed and constructed in accordance with this invention and generally designated by the numeral 10. The clamp 10 comprises a U-shaped body 11 of resilient material having free ends 12 and 13 normally spaced in substantially parallel relationship, and manually operable cam means, generally designated by the numeral 14, secured to one of the free ends, such as the end 12, and engageable with the other of the free ends, like the end 13, for biasing the free end 13 into clamping engagement with the end 12 in response to rotation of the cam means.

The body 11 is, as mentioned above, U-shaped in configuration and is preferably made of a round metal wire having relatively-flat free ends or legs 12 and 13. One of the free ends, the end 13, is offset as indicated at 16 to form an offset outer end 17 substantially decreased in spacing from the outer end 18 of the free end 12.

A clip or bracket 19 is secured to the free end 12 of the body 11 as by a pair of tabs 21 and 22 of a bight portion 23 of the bracket 19 being peened, rolled, or otherwise encircled around an offset portion 24 of the free end 12. The bracket 19 spans the free ends 12 and 13 of the clamp body 11 so that outer ends 26 thereof extend outwardly of the free end 13.

The cam means 14 is rotatably secured to the outer ends 26 of the bracket 19 so as to be engageable with an outer surface of the leg 13 as by a fastener in the form of a pin, rivet, or the like, indicated at 27.

Figure 2:
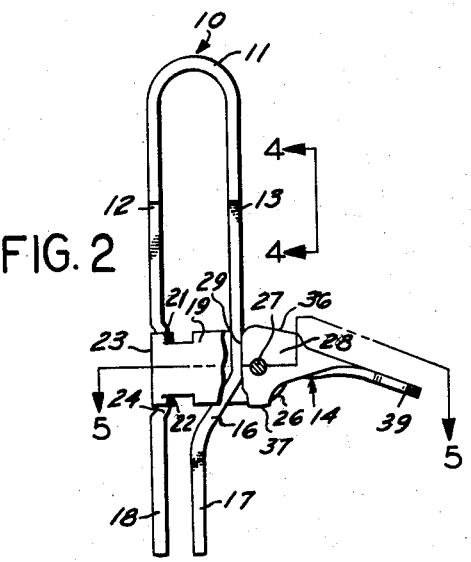
FIGURE 2 is a side view, in elevation, of the end clamp with parts broken away for greater clarity.
Figure 4:
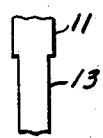
FIGURE 4 is an enlarged, fragmentary, side view as viewed substantially along the lines 4—4 of FIGURE 2.

The cam means 14 includes a relatively flat portion 28 having cam edges or flats engageable with the outer surface of the free end 13. As best seen in FIGURE 2, when the cam 28 is rotated to engage a flat surface 29 with the end 13, the radial distance to the pivot 27 is relatively short and allows the outer ends 17 and 18 to be separated, in spaced parallel relationship. In this position, the outer ends 17 and 18 are insertable in adjacent tubular openings 31 and 32 of a pair of juxtaposed cellular members 33 and 34, respectively. The tubular openings 31 and 32 extend transversely relative to the components 33 and 34 and are formed by the hexagonal openings comprising the cellular material known as a honeycomb construction and commonly used sandwiched between outer, relatively-thin skins.

Figure 3:
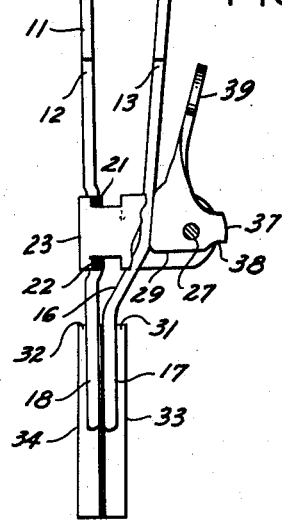
FIGURE 3 is a side view, similar to FIGURE 2, with parts thereof illustrated in a changed position.

The cam 14 includes a flat surface 36 having a radial distance to the pivot 27 substantially greater than the radial distance of the cam surface 29 so as to bias the free end 13 towards the end 12 in response to rotation of the cam 14 into the position illustrated in FIGURE 3, thereby positioning the outer ends 17 and 18 tightly together in clamping relationship, when the cam means 14 is rotated in a counter clockwise direction as viewed in the drawings.

A third cam surface 37 is provided on the cam 14 and separated from the cam surface 29 by a notch 38 whereby the end 13 may be biased towards the end 12 in response to rotation of the cam in a clockwise direction wherein the radial distance of the notch 38 is sufficient to temporarily bias the outer ends 17 and 18 into clamping engagement and the surface 37 locks the outer ends 17 and 18 together. A handle 39 is formed integrally with the cam means 14, or is optionally secured thereto, to facilitate rotation of the cam.

Figure 5:
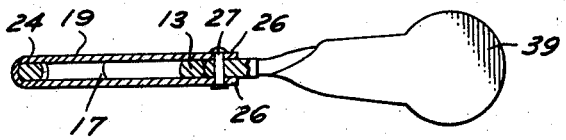
FIGURE 5 is a horizontal, cross-sectional view as taken substantially along the line 5—5 of FIGURE 2.

As best seen in FIGURE 5, the free end 13 is movable within the confines of the bracket 19 so as to prevent movement of the outer end 17 into non-co-planar relationship with the outer end 18. Rotation of the ends 12 and 13 is prevented by virtue of the relatively-flat cross section thereof.

The clamping of the components 33 and 34 together by the outer ends 17 and 18 insures a tight fit between ends thereof and provides tubular openings 40 formed of half-sections of the openings 31 and 32 which may be filled with a thermoplastic, or other, compound 41 for semi-permanent securement of the components 33 and 34, after which the clamp 10 may be released by rotation of the cam 14 to position the cam surface 29 against the end 13 of the clamp so as to permit the outer ends 17 and 18 to separate. The honeycomb sections 33 and 34 are preferably positioned to be juxtaposed against one of the skins 42 during the pouring of the compound 41 or to any suitable relatively-flat support means. Subsequently, the components 33 and 34 are permanently secured, by electro-welding, or the like, to the skins 42 to form a cellular core therefor.

While there is herein shown and described what is conceived to be the most practical and preferred embodiments of this invention, it is recognized that departures may be made therefrom within the scope of this invention which is not limited to the details disclosed herein but is to be accorded the full scope of the claim so as to embrace any and all equivalent devices.

What is claimed as new and desired to secure by Letters Patent is:

An end clamp for clamping a pair of cellular components together and in end-to-end relationship, comprising a U-shaped body of resilient material having legs extending in spaced parallel relation, gripping portions at the free ends of said legs, a first one of said legs having an offset portion to place the gripping portion of said leg close to the gripping portion of the other leg and in normally spaced parallel relationship for insertion into adjacent openings in each of said cellular components juxtaposed in end-to-end relationship; said other leg having an offset portion, bracket means secured to the offset portion of said other leg, said bracket means straddling said first leg and having an end normally extending outwardly of said first leg; manually operable cam means rotatably mounted on said outer end of said bracket means for normally holding said legs to position said gripping portions in normal spaced parallel relationship and for selectively moving said first leg towards said other leg to clamp adjacent walls of said adjacent openings together between said gripping portions, and said cam means having a cam surface for moving said first leg by an amount greater than required to move the gripping portions together so that said gripping portions are flexed into parallel relationship when clamping said adjacent walls.

References Cited by the Examiner

UNITED STATES PATENTS

| 157,293 | 12/74 | Pitt | 269—157 |
| 1,445,710 | 2/23 | Rathbone et al. | 81—43 |
| 2,463,451 | 3/49 | Yates | 24—258 |
| 2,952,282 | 9/60 | McHenry | 269—147 |

FOREIGN PATENTS 1,138,820  2/57  France.

FRANK SUSSKO, *Primary Examiner.*

THOMAS J. HICKEY, ROBERT C. RIORDON,
*Examiners.*